US009436610B2

(12) United States Patent
Ries et al.

(10) Patent No.: US 9,436,610 B2
(45) Date of Patent: Sep. 6, 2016

(54) ENHANCED PRE-FETCH IN A MEMORY MANAGEMENT SYSTEM

(71) Applicant: STMicroelectronics International N.V., Amsterdam (NL)

(72) Inventors: Gilles Ries, Saint-Jean De Moirans (FR); Ennio Salemi, Grenoble (FR); Sana Ben Alaya, Fontaine (FR)

(73) Assignee: STMicroelectronics International N.V., Amsterdam (NL)

( * ) Notice: Subject to any disclaimer, the term of this patent is extended or adjusted under 35 U.S.C. 154(b) by 76 days.

(21) Appl. No.: 14/464,750

(22) Filed: Aug. 21, 2014

(65) Prior Publication Data

US 2015/0058578 A1    Feb. 26, 2015

(30) Foreign Application Priority Data

Aug. 23, 2013 (EP) ..................................... 13181535

(51) Int. Cl.
| G06F 12/00 | (2006.01) |
| G06F 12/08 | (2016.01) |
| G06F 12/10 | (2016.01) |

(52) U.S. Cl.
CPC ....... *G06F 12/0862* (2013.01); *G06F 12/1027* (2013.01); *G06F 12/1063* (2013.01); *G06F 2212/304* (2013.01); *G06F 2212/507* (2013.01); *G06F 2212/602* (2013.01); *G06F 2212/684* (2013.01)

(58) Field of Classification Search
CPC ............................. G06F 12/00; G06F 12/0215
USPC .................................. 711/100, 118, 137, 154
See application file for complete search history.

(56) References Cited

U.S. PATENT DOCUMENTS

| 2004/0143720 A1* | 7/2004 | Mansell | G06F 12/1491 711/206 |
| 2004/0148480 A1* | 7/2004 | Watt | G06F 9/4812 711/163 |
| 2013/0103923 A1* | 4/2013 | Pan | G06F 12/1027 711/207 |

OTHER PUBLICATIONS

EPO Search Report and Written Opinion for EP 13181535.9 mailed Feb. 10, 2014 (6 pages).

* cited by examiner

*Primary Examiner* — Tuan Thai
(74) *Attorney, Agent, or Firm* — Gardere Wynne Sewell LLP

(57) ABSTRACT

A memory management unit may send page table walk requests to a page table descriptor in a main memory system and receive address translation information, with the page table walk requests including information that specifies an amount of further address translation information, and receive the further address translation information. The cache unit may intercept the page table walk requests, and modify content of the intercepted page table walk requests so the information that specifies the amount of further address translation information is extended from a first amount to a second amount greater than the first amount. The cache unit may store the second amount of further address translation information for use with data requests that are subsequent to a current data request, and provide the address translation information based upon an intercepted page table walk request being associated with address translation information already stored in the cache unit.

20 Claims, 4 Drawing Sheets

ENHANCED PRE-FETCH IN A MEMORY MANAGEMENT SYSTEM

CROSS REFERENCE TO RELATED APPLICATION

This application claims the priority benefit of the EP Patent Application Number 13181535.9, filed on Aug. 23, 2013, entitled "Enhanced Pre-Fetch Mechanism for Memory Management Unit," which is hereby incorporated by reference to the maximum extent allowable by law.

FIELD OF THE DISCLOSURE

The field of the present disclosure is the control of memory management systems, and, in particular, the translation of virtual addresses into physical addresses.

BACKGROUND

A memory management unit, MMU, is a module in a virtual memory system that provides address translation services, as well as memory fragmentation and memory protection capabilities to a group of devices sharing the MMU in the system. Information that enables the MMU to map virtual addresses to physical addresses is stored in a page table. Typically, the page table is stored in physical memory that is part of the main memory of the system in which the MMU is operating. One part of the MMU is a cache of recently used mappings from the page table. This cache is called a translation look aside buffer, TLB.

One procedure that the MMU performs is a page table walk, PTW, which is a mechanism of controlling (sometimes referred to as "walking") the memory device to read page table descriptors containing address translation information for a given MMU Device.

Another procedure that is performed by the MMU is TLB pre-fetching. TLB pre-fetching is the mechanism of address prediction aimed to refill the MMU TLB with the appropriate translated addresses before they are requested by an initiator. Here, an initiator is a device that is coupled to the MMU data request interface and that is capable of issuing transactions (i.e. a data request) through the MMU.

In the existing MMU devices, TLB buffering capabilities and TLB pre-fetching mechanisms may be a bottleneck for the overall performance of the system due to TLB misses and the latency involved when fetching page table entries from the main memory system.

In other words, there is a desire for enhancing TLB pre-fetch capabilities to mask page table walk latency caused by TLB misses, as will be illustrated in the following. With reference to Figure Aa, a MMU 102 contains a TLB 104 with a depth n, and a pre-fetch buffer 106 with depth m, the depth being the number of page table entries each buffer can hold. The MMU 102 has data request interface 112 where data requests are received. As will be understood by those of skill in the art, the mmu 102 comprises control circuitry (CTRL) 114 that is configured to control the mmu 102 as described herein and illustrated in FIG. 1a as a functional block for the sake of clarity. The page table entries are virtual-to-physical address translation information located inside the mmu page table descriptor 108 in the main memory system 110.

When a transaction, i.e. a data request, occurs on the MMU data request interface 112, the TLB 104 is looked up to identify the TLB entry that corresponds to the incoming data request. A data request has attributes in terms of parameters that are associated with the address and data of the request in a given bus protocol (e.g., for the advanced extensible interface, AXI, bus protocol, the transactions attributes include address, burst size, burst length, type and cacheability). Moreover, realization of the look-up is by the control circuitry 114. If the corresponding entry is found, the address is translated and the data transaction is issued to the main physical memory.

If the entry is not found, i.e. a TLB miss occurs, a PTW is performed to fetch the corresponding entry from the page table descriptor. In parallel, a pre-fetch request is also issued to fetch the next page table entry in the page table descriptor, i.e. the page table entry that is subsequent to the entry corresponding to the address causing the miss in the TLB.

FIG. 1B illustrates the content of a TLB and MMU page table descriptor (e.g. corresponding to TLB 104 and page table descriptor 108 in FIG. 1A and how a PTW request re-fills the TLB. The "next" page table entry is the virtual to physical translation of the current virtual address that caused the miss plus an address stride. The address stride corresponds to the description of a memory page that has a given size. The size of a page in the page table descriptor is software driven and varies from one implementation to another.

In the implementations that exist today, 32-bit address space page table descriptors are described on three levels. Level 1 may contain the fragmentation of the memory space in 1 GB regions, while level 2 may contain the fragmentation of a 1 GB region into 2 MB regions. The descriptor may contain 512 entries, and level 3 may contain the memory mapping of each 2 MB region into 4 KB pages.

To perform an address translation, an MMU performs three page table walk accesses to level 1, level 2, and then level 3 descriptors (assuming that the memory is mapped in 4 KB pages).

In existing MMU devices, TLB buffering capabilities and TLB pre-fetching mechanisms may be a bottleneck for the system overall performance due to TLB miss and latency involved in fetching page table entries from the main memory system. This latter issue may be shared between a big number of hardware devices. Furthermore, MMU pre-fetch logic usually contains buffering capabilities for the last translation level (i.e. level 3).

In addition to that, a single MMU may be shared between several initiators, an initiator being a device coupled directly to the MMU data request interface and capable of issuing transactions through the MMU. In such cases, the TLB, pre-fetch buffers and other MMU device resources are used by several sources and the miss rate in the TLB is higher. This is due to the fact that these initiators are independent and access several distinct buffers in the main memory simultaneously. In addition, the access pattern within the same buffer may not be contiguous in the virtual address space, which makes reuse of TLB entries very low and pre-fetching the next page table descriptor less than optimal.

Moreover, TLB replacement policy can also be a limitation depending on the traffic access pattern. A replacement policy is the implementation of an algorithm responsible for replacing the TLB entries when the TLB is full. The algorithm is responsible for choosing the TLB entry that has to be evicted to replace it with a newly requested one.

In some cases, the TLB replacement policy is implemented via round-robin. Round-robin is a scheduling algorithm where the eviction order of the TLB entries is cyclic and specific priority may not be applied to the TLB entries. The eviction of the TLB is then based on the location of the entries and could lead to the eviction of entries that are currently in use, especially if TLB depth is limited (largely less than the number of buffers accessed simultaneously).

In view of the current state of memory management systems, there is a desire for enhancing TLB pre-fetch capabilities to mask page table walk latency caused by a TLB miss.

SUMMARY

In order to mitigate at least some of the drawbacks as discussed above, there is a first embodiment directed to a memory management system that includes a memory management unit, MMU, that may be configured to receive data requests associated with virtual addresses from data request initiators and configured to translate the virtual addresses into physical addresses in a main memory system.

The configuration of the memory management system is such that it may be capable of obtaining address translation information from an address translation look-aside buffer, TLB, in the MMU. The memory management system may further send page table walk, PTW, requests to a page table descriptor in the main memory system and receive address translation information from the page table descriptor. The PTW requests may include information that specifies an amount of further address translation information, and the further address translation information may be associated with data requests that are subsequent to a current data request.

The memory management may also receive the further address translation information from the page table descriptor and store the further address translation information for use in connection with data requests that are subsequent to a current data request.

The memory management system of the first aspect may also include a cache unit, ETC. The cache unit may be configured to intercept the PTW requests, and modify content of the intercepted PTW requests such that the information that specifies an amount of further address translation information may be extended from a first amount to a second amount, with the second amount being greater than the first amount. The cache unit may also be configured to store the second amount of further address translation information. If an intercepted PTW request is associated with address translation information already stored in the ETC, the cache unit may provide the address translation information to the MMU, thereby avoiding sending a PTW request to the page table descriptor and avoiding reception of further address translation information from the page table descriptor.

In some embodiments, the MMU can comprise an address prediction module that is configured to determine an identity, ID, of a data request initiator, calculate, based on the ID, an address stride prediction value, and provide the address stride prediction value to the ETC. In these embodiments, the ETC may be further configured to receive the address stride prediction value, and based on the address stride prediction value, may be configured to perform the extension of the information that specifies an amount of further address translation information.

In order to mitigate at least some of the drawbacks as discussed above, there is a second embodiment directed to a method of operating a memory management system. The system may include a memory management unit, MMU, configured to receive data requests associated with virtual addresses from data request initiators and configured to translate the virtual addresses into physical addresses in a main memory system. This translation may be performed by obtaining address translation information from an address translation look-aside buffer, TLB, in the MMU. A page table walk, PTW, may send requests to a page table descriptor in the main memory system and receive address translation information from the page table descriptor. The PTW requests may include information that specifies an amount of further address translation information, and the further address translation information may be associated with data requests that are subsequent to a current data request.

Further address translation information may be received from the page table descriptor, and the further address translation information may be stored for use in connection with data requests that are subsequent to a current data request.

A method aspect of the second embodiment may include intercepting, in a cache unit, ETC, the PTW requests. This method according to the embodiment may also include modifying, in the ETC, content of the intercepted PTW requests such that the information that specifies an amount of further address translation information may be extended from a first amount to a second amount, with the second amount being greater than the first amount. The method according to the embodiment may also include storing, in the ETC, the second amount of further address translation information, and if an intercepted PTW request is associated with address translation information already stored in the ETC, the method according to the embodiment may include providing, from the ETC, the address translation information to the MMU, thereby avoiding the sending of a PTW request to the page table descriptor and avoiding the reception of further address translation information from the page table descriptor.

In some embodiments, the method may include determining, in an address prediction module comprised in the MMU, an identity, ID, of a data request initiator. This method may also include calculating, in the address prediction module, based on the ID, an address stride prediction value. This method may further include providing, from the address prediction module, the address stride prediction value to the ETC, and receiving, in the ETC, the address stride prediction value. Based on the address stride prediction value, in the ETC, the extension of the information that specifies an amount of further address translation information may be performed.

It can be seen that, by the addition of a dedicated external TLB cache the buffering capacity of the TLB is enlarged with a reduced latency as a result. For example, when using a 128 byte cache line, implicit pre-fetch of 15 entries is enabled in addition to an 8 byte entry requested effectively by the MMU.

DETAILED DESCRIPTION

Figure 1A:
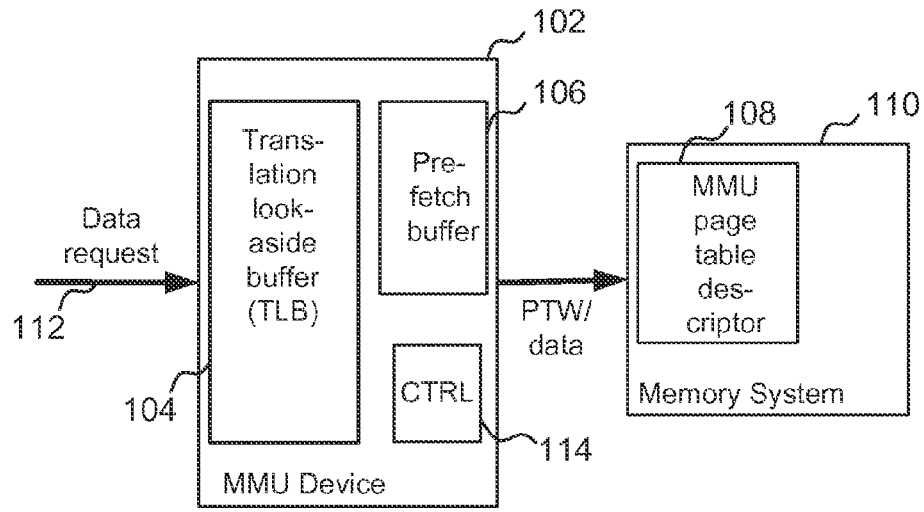
FIG. 1A schematically illustrates a block diagram of a memory management system.
Figure 1B:
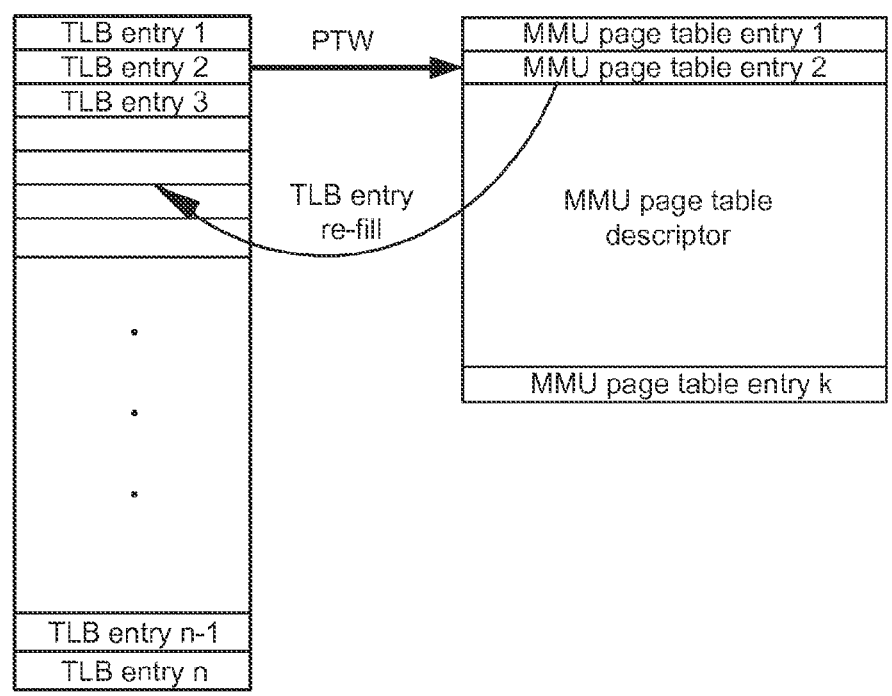
FIG. 1B schematically illustrates content of a TLB and a page table descriptor.
Figure 2:
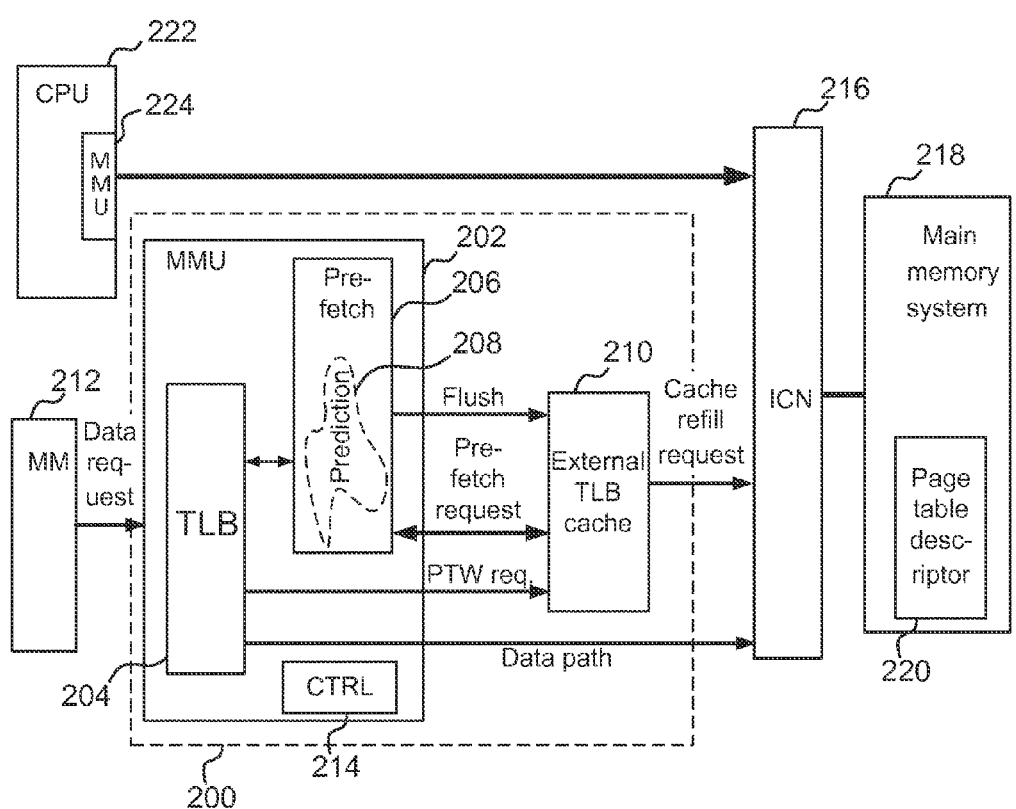
FIG. 2 schematically illustrates a block diagram of a memory management system.

With reference to FIG. 2, a memory management system 200 will now be described. The system 200 comprises a MMU 202, and interacts with an architecture that has number of entities including a processor 222 having an internal MMU 224, a multimedia subsystem 212, an interconnect network 216, and a main memory system 218. The MMU comprises a TLB 204, a pre-fetch cache circuitry 206 that includes prediction functionality 208 (i.e. a prediction algorithm), and control circuitry 214. The system can be integrated into a system-on-chip, SoC, architecture, for example.

Data requests that include virtual addresses are received by the MMU 202 from the multimedia subsystem 212. The data requests are processed by the MMU 202 as described above and PTW requests are issued in cases where the desired address translation information may not be available in the TLB. The pre-fetching process, as summarized above, operates by way of pre-fetch requests and flushing as illustrated in FIG. 2.

In this disclosure, it is assumed that MMU device PTW requests can be distinguished at MMU device boundaries (either because issued through a dedicated port, or because they are tagged differently than translated transactions at MMU data master interface).

In contrast to certain memory management systems, the present disclosure illustrates two enhancements that mask TLB misses and reduce page table walk latency. A first enhancement is the addition of an external (i.e. external to the MMU) hardware component that is named external TLB cache, ETC, 210. In the example of FIG. 2, the ETC 210 is coupled to the MMU device PTW master port through which the PTW requests are issued. If the PTW transactions do not have a dedicated interface, the ETC can be coupled to a MMU data master port (however, such a variant is not illustrated in FIG. 2). The other enhancement involves an extension of the pre-fetch prediction algorithm 208 to add virtual address stride prediction that depends on the transaction initiator ID (i.e. source of the request or transaction).

As illustrated in FIG. 2 the ETC 210 may be coupled such that the pre-fetch and flush procedure operations via the ETC are performed such that cache refill requests are issued by the ETC 210 to the page table descriptor 220 in the main memory system 218 via the interconnect network 216.

The ETC may be a cache that, for example, has a 128 bytes line size. If a page table entry is 8 bytes long, a cache line may be able to hold up to 16 page table entries. The role of the ETC is to intercept PTW bursts (i.e. requests or transactions) issued by the MMU 202 and extend the burst length to the line size of the ETC. For example, the PTW burst length can be either 8 or 16 bytes. In the case where the ETC line is 128 bytes, each intercepted PTW transaction may be turned to a 128 byte transaction, which may allow the fetching of 16 times more entries than the initial PTW 8 byte burst. The other PTW transaction attributes are kept the same (i.e. the size is modified).

Figure 3:
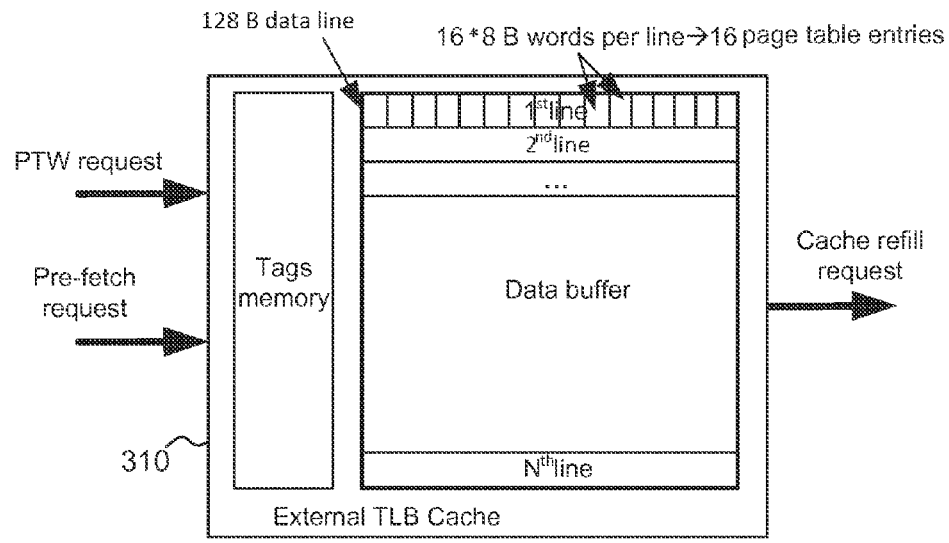
FIG. 3 schematically illustrates a block diagram of an ETC.

This is illustrated in further detail by the ETC 310 in FIG. 3. The ETC 310 can be the ETC 210 in FIG. 2. The addition of an ETC having a line size that is bigger than the PTW burst size introduces an enhancement of the MMU device pre-fetching capabilities natively. Instead of pre-fetching the single next entry, 16 entries are fetched from the page table descriptor at once. The requested amount of data is returned to the MMU device PTW request. The 128 byte burst is stored in the ETC. When a miss occurs in the TLB the next time, and the requested address belongs to one of the 16 pre-fetched entries located in the ETC, the PTW request may hit in the ETC and the transaction may not pay the latency of fetching the page table descriptor from the main memory system.

The ETC replacement policy may be a least recently used policy, LRU. This means that the eviction of ETC lines may be based on the frequency of using the page table entries. The least used entry may be evicted. This helps see to a lack of eviction happening on a cached line where a hit happened recently, and which is thus in use by the MMU.

It is to be noted that the ETC 210, 310 can be sized differently depending on initiator traffic type and buffer size used usually by the initiator. For example, take a video encoding entity that reads two reference buffers of 1 megabyte each, and writes an encoded output buffer of 1 megabyte in the main memory. Assume the memory space is 4 kilobytes fragmented as described in the previous paragraph, and that the buffers used by the video encoding entity are contiguous in the virtual address space. If the size of one entry in the page table descriptor is 8 bytes, the video encoding entity may fetch 768 entries to perform the encoding task (1 megabyte buffer=256*4 kilobyte pages). An ETC size of 768*8 bytes=6.144 kilobyte may be adequate for the video encoding entity traffic needs especially if the full buffer is to perform specific operations.

As FIG. 2 illustrates, the MMU device pre-fetch functionality may be extended to have a dedicated port handling pre-fetch requests and coupled to ETC 210. For each MMU internal TLB miss, the miss may be detected inside the MMU device pre-fetch module 206. The intercepted miss address and transaction identity, ID (i.e. the identity of the initiator or requesting entity such as a multimedia subsystem, a processor, etc.), are processed inside the pre-fetch module 206 to calculate the address to pre-fetch. The address prediction mechanism may be based on a user-defined software interface, SW, in the form of a register, or a set of registers, that defines how address stride is calculated by the prediction algorithm. The registers, for example located in the pre-fetch module 206, are configured to be programmed by SW before the MMU device starts processing data transactions. Such a register is illustrated in FIG. 4.

The pre-fetch user-defined interface can be used to enable pre-fetch for a specific type of data traffic or for some initiators (e.g. a specific processor or specific multimedia subsystem etc. having a specific ID). It is up to the SW to determine which traffic has performance requirements that may be assisted by pre-fetch enabling.

Figure 4:
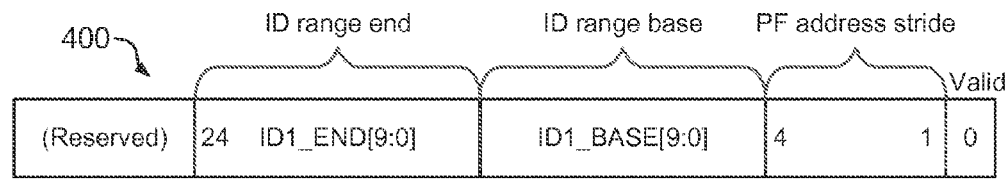
FIG. 4 schematically illustrates a register for use in controlling a memory management system.

For example, now also with reference to FIG. 4, when a miss in the TLB occurs, a PTW may be performed by the MMU device. An added functionality of the present disclosure is that an additional pre-fetch request may be computed and transferred to ETC. The address stride prediction may be based on initiator ID. The ID of the transaction that caused the miss may be compared to the ID range pre-programmed in the user-defined pre-fetch register user_reg[ID1_END: ID1_BASE]. If the ID matches, the pre-fetch address may be equal to @current_address+user_reg[4:1]. The bitfield user_reg[4:1] being pre-programmed with the address stride the SW wants to apply to the transactions belonging to the ID range.

For example, the ID range can be an entity/transaction source identifier. It may be possible to implement as many user-defined registers as desired to cover the various types of entities/initiators coupled to the same MMU device or to cut ID ranges as precisely as desired to differentiate entity traffic threads (when possible).

As mentioned above, address stride may be a multiple of ETC line size. This means that pre-fetch may be either linear or n-linear. In case it is linear, the new pre-fetch request corresponds to the next ETC line, i.e. next 128 bytes of the page table descriptor, for a given TLB miss. In case it is n-linear, "n" is the number of page table entries to jump inside the page table descriptor before pre-fetching the next 128 bytes. If the ETC line size is "L", "n" is a multiple of "L".

Figure 5A:
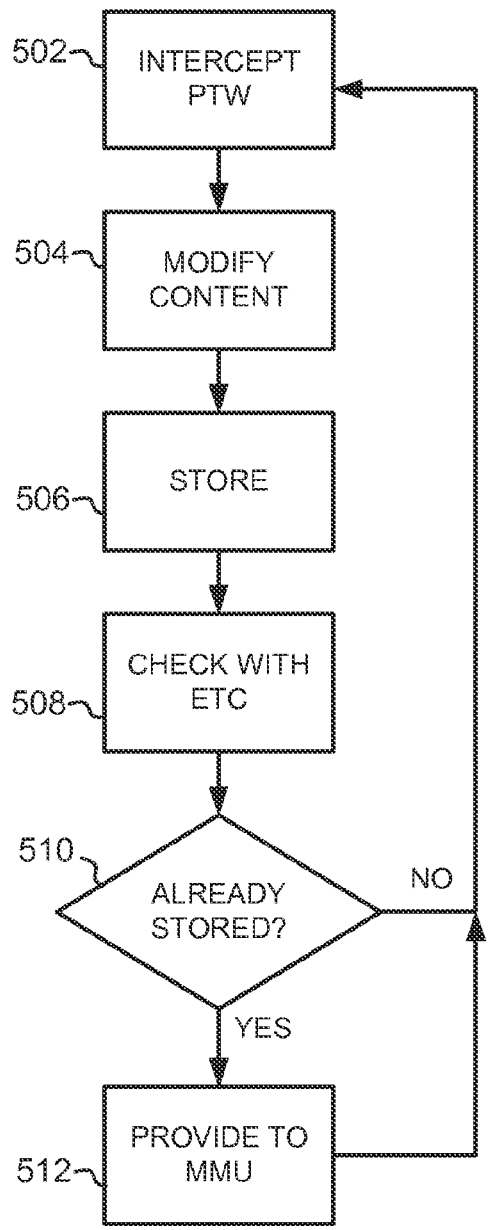
FIGS. 5A and 5B are flow charts of methods of controlling a memory management system.
Figure 5B:
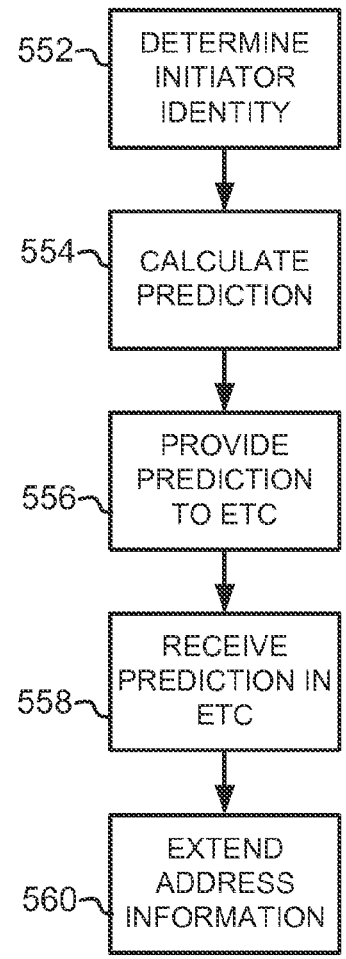

A method that realizes the above is illustrated in the flow chart in FIGS. 5A and 5B. The method can be realized in the memory management system as illustrated above in FIGS. 2-4. For example, control circuitry 214 can interact with the functionality of the TLB 204, the pre-fetch cache circuitry 206 and the ETC 210, 310 in order to perform the method of the embodiment.

The method commences with an interception step 502 performed in the ETC 210, where the PTW requests are intercepted. In a modification step 504, performed in the ETC, content of the intercepted PTW requests may be modified such that the information that specifies an amount of further address translation information may be extended from a first amount to a second amount, the second amount being greater than the first amount.

In a storage step 506, performed in the ETC, the second amount of further address translation information may be stored. If an intercepted PTW request is associated with address translation information already stored in the ETC, a provision step 512 may be performed that entails providing, from the ETC, the address translation information to the MMU, thereby avoiding the sending of a PTW request to the page table descriptor and avoiding the reception of further address translation information from the page table descriptor.

With reference to FIG. 5B, the method can also include steps performed in collaboration between the address prediction module 206 and the ETC 210, 310. In a determination step 552 performed in the address prediction module 206 an identity, ID, of a data request initiator may be determined. An address stride prediction value may then be calculated in the address prediction module 206 in a calculation step 554. The address stride prediction value may then be provided from the address prediction module 206 to the ETC 210, 310 in a provision step 556.

The address stride prediction value may be received in the ETC 210, 310 in a reception step 558 and, based on the received address stride prediction value, the ETC performs, in an extension step 560, the extension of the information that specifies an amount of further address translation information.

The arrangements and methods described herein have advantages that can be summarized as follows. The memory management unit TLB buffering capacity may be enlarged by the addition of a dedicated external TLB Cache. Using a 128 byte cache line enables the implicit pre-fetch of 15 entries in addition to the 8-byte entry requested effectively by the MMU. The extended pre-fetch logic may be based on user-defined SW interface. The user-defined SW interface allows the identification of transactions causing the TLB miss based on the initiator ID. The user-defined SW interface allows the defining of a dedicated pre-fetch depth per initiator or per transaction ID. The pre-fetch dedicated logic has its own master port coupled to ETC. In addition, the pre-fetch dedicated logic benefits from implicit 128 byte inner ETC pre-fetching.

While this detailed description has set forth some embodiments of the present invention, the appended claims cover other embodiments of the present invention which differ from the described embodiments according to various modifications and improvements. Within the appended claims, unless the specific term "means for" or "step for" is used within a given claim, it is not intended that the claim be interpreted under 35 U.S.C. §112, paragraph 6.

The invention claimed is:

1. An electronic device comprising:
a memory management unit configured to receive data requests associated with virtual addresses from data request initiators and to translate the virtual addresses into physical addresses in a main memory system by:
obtaining address translation information from an address translation look-aside buffer in the memory management unit,
sending page table walk requests to a page table descriptor in the main memory system and receiving address translation information from the page table descriptor, the page table walk requests including information that specifies an amount of further address translation information, the further address translation information being associated with data requests that are subsequent to a current data request, and
receiving the further address translation information from the page table descriptor and storing the further address translation information for use in connection with the data requests that are subsequent to the current data request;
wherein the memory management system comprising a cache unit is configured to:
intercept the page table walk requests,
modify content of the intercepted page table walk requests such that the information that specifies the amount of further address translation information is extended from a first amount to a second amount, the second amount being greater than the first amount,
store the second amount of further address translation information, and
provide the address translation information based upon an intercepted page table walk request being associated with address translation information already stored in the cache unit.

2. The electronic device of claim 1, wherein the cache unit providing the address translation information based upon the intercepted page table walk request being associated with the address translation information already stored in the cache unit serves to avoid the sending of the page table walk request to the page table descriptor and to avoid the reception of the further address translation information from the page table descriptor.

3. The electronic device of claim 1, wherein the memory management unit comprises an address prediction module configured to:
determine an identity of a data request initiator,
calculate, based on the identity of the data request initiator, an address stride prediction value, and
provide the address stride prediction value to the cache unit; and
wherein the cache unit is further configured to:
receive the address stride prediction value, and
perform the extension of the information that specifies an amount of further address translation information based on the address stride prediction value.

4. The electronic device of claim 3, wherein the address prediction module comprises a register that is configured to contain the identity of at least one data request initiator and information associated therewith, the information associated with the identity of the at least one data request initiator for enabling and disabling the cache unit to operate based on the identity.

5. The electronic device of claim 3, wherein the address prediction module comprises a register that is configured to contain the identity of at least one data request initiator and information associated therewith, the information associated with the identity of the at least one data request initiator for calculating an address stride prediction value.

6. The electronic device of claim 1, wherein the electronic device comprises a system-on-a-chip.

7. The electronic device of claim 1, wherein the electronic device comprises a microchip.

8. The electronic device of claim 1, wherein the electronic device comprises a mobile media device.

9. An article comprising:
a memory management unit configured to:
send page table walk requests to a page table descriptor in a main memory system and receive address translation information from the page table descriptor, the page table walk requests including information that specifies an amount of further address translation information, and
receive the further address translation information from the page table descriptor; and a cache unit configured to:
intercept the page table walk requests,
modify content of the intercepted page table walk requests such that the information that specifies the amount of further address translation information is extended from a first amount to a second amount, the second amount being greater than the first amount,
store the second amount of further address translation information for use in connection with data requests that are subsequent to a current data request, and
provide the address translation information based upon an intercepted page table walk request being associated with address translation information already stored in the cache unit from a data request that is prior to the current data request.

10. The article of claim 9, wherein providing the address translation information based upon the intercepted page table walk request being associated with the address translation information already stored in the cache unit serves to avoid the sending of the page table walk request to the page table descriptor and to avoid the reception of the further address translation information from the page table descriptor.

11. The article of claim 9, wherein the memory management unit comprises an address prediction module configured to:
determine an identity of a data request initiator,
calculate, based on the identity of the data request initiator, an address stride prediction value, and
provide the address stride prediction value to the cache unit; and
wherein the cache unit is further configured to:
receive the address stride prediction value, and
perform the extension of the information that specifies an amount of further address translation information based on the address stride prediction value.

12. The article of claim 11, wherein the address prediction module comprises a register that is configured to contain the identity of at least one data request initiator and information associated therewith, the information associated with the identity of the at least one data request initiator for enabling and disabling the cache unit to operate based on the identity.

13. The article of claim 11, wherein the address prediction module comprises a register that is configured to contain the identity of at least one data request initiator and information associated therewith, the information associated with the identity of the at least one data request initiator for calculating the address stride prediction value.

14. A method of operating an electronic device comprising:
configuring a memory management unit to receive data requests associated with virtual addresses from data request initiators and to translate the virtual addresses into physical addresses in a main memory system by:
obtaining address translation information from an address translation look-aside buffer in the memory management unit,
sending page table walk requests to a page table descriptor in the main memory system and receiving address translation information from the page table descriptor, with the page table requests including information that specifies an amount of further address translation information, and with the further address translation information being associated with data requests that are subsequent to a current data request, and
receiving the further address translation information from the page table descriptor and storing the further address translation information for use in connection with data requests that are subsequent to a current data request;
intercepting the page table walk requests, using a cache unit;
modifying content of the intercepted PTW requests such that the information that specifies the amount of further address translation information is extended from a first amount to a second amount, the second amount being greater than the first amount, using the cache unit;
storing the second amount of further address translation information in the cache unit; and
providing the address translation information from the cache unit to the memory management unit based upon the intercepted page table walk request being associated with address translation information already stored in the cache unit.

15. The method of claim 14, wherein providing the address translation information from the cache unit to the memory management unit based upon the intercepted page table walk request being associated with the address translation information already stored in the cache unit avoids sending a page table walk request to the page table descriptor and avoids reception of further address translation information from the page table descriptor.

16. The method of claim 14, further comprising:
determining an identity of a data request initiator;
calculating an address stride prediction value based upon the identity of the data request initiator;
providing the address stride prediction value from the address prediction module to the cache unit;
receiving the address stride prediction value at the cache unit; and
performing the extension of the information that specifies an amount of further address translation information in the cache unit, based upon the address stride prediction value.

17. The method of claim 14, further comprising enabling the cache unit to operate based on the identity of the data request initiator.

18. A method comprising:
sending page table walk requests to a page table descriptor in a main memory system and receive address translation information from the page table descriptor, the page table walk requests including information that specifies an amount of further address translation information, using a memory management unit;

receiving the further address translation information from the page table descriptor, using the memory management unit;

intercepting the page table walk requests, using a cache unit;

modifying content of the intercepted page table walk requests such that the information that specifies the amount of further address translation information is extended from a first amount to a second amount, the second amount being greater than the first amount, using the cache unit;

storing the second amount of further address translation information for use in connection with data requests that are subsequent to a current data request, using the cache unit;

providing the address translation information based upon an intercepted page table walk request being associated with address translation information already stored in the cache unit from a data request that is prior to the current data request.

19. The method of claim 18, wherein providing the address translation information based upon the intercepted page table walk request being associated with the address translation information already stored in the cache unit serves to avoid the sending of the page table walk request to the page table descriptor and to avoid the reception of the further address translation information from the page table descriptor.

20. The method of claim 18, further comprising:

determining an identity of a data request initiator, using an address prediction module of the memory management unit;

calculating, based on the identity of the data request initiator, an address stride prediction value, using the address prediction module;

providing the address stride prediction value to the cache unit, using the address prediction module;

receiving the address stride prediction value, using the cache unit; and performing the extension of the information that specifies an amount of further address translation information based on the address stride prediction value, using the cache unit.

* * * * *